Patented Aug. 22, 1933

1,923,565

UNITED STATES PATENT OFFICE 1,923,565

TESTING APPARATUS AND METHOD

Arthur O. Austin, near Barberton, Ohio, assignor, by mesne assignments, to The Ohio Brass Company, Mansfield, Ohio, a Corporation of New Jersey Application August 30, 1930. Serial No. 479,008

17 Claims. (Cl. 175—183)

This invention relates to testing apparatus for detecting faulty insulators or insulator parts in service in a transmission line.

One object of the invention is to provide a test apparatus by which faulty parts may be detected in which the fault has a resistance so high as to prevent detection by methods now commonly used.

A further object of the invention is to provide testing apparatus which shall be convenient to apply and accurate in its indications.

A further object is to provide testing apparatus of improved construction and operation and an improved method of testing insulators.

Other objects and advantages will appear from the following description.

The invention is exemplified in the combination and arrangement of parts shown in the accompanying drawings and described in the following specification, and it is more particularly pointed out in the appended claims.

In the drawings:

Fig. 3 is a diagram showing a modified circuit connection.

In high voltage transmission lines the insulators most suitable for operation are formed of dielectric material such as porcelain or glass which is not malleable, the parts being assembled by means of metal fittings. Under operating conditions, the difference in linear coefficient of expansion between metal fittings and the dielectric is likely to cause destruction of the dielectric by cracking after a period of time. In some cases the dielectric may have internal faults which will open up in time if the structure is not sufficiently dense. The absorption of water or conducting material may also reduce or eliminate the usefulness of the dielectric member. It therefore may become necessary after a line has been in service for a period of time to replace defective insulators or parts of insulators.

The removal of faulty material greatly improves the reliability of the insulator and may prevent complete failure by puncturing or flashing over from conductor to ground. As the probability of trouble, due to the presence of faulty parts in an insulator, usually increases as some power of the depreciation, it is seen that a reduction in the amount of depreciation is a material benefit in establishing a high degree of reliability. The more refined the test method used to detect faults the more easily can depreciated material be located, and the higher will be the standard maintained. With my improved method, it is possible to detect faulty material not heretofore possible with methods commonly used.

In the testing of transmission line insulators to detect faulty units, several methods have been used in the past. The megger, which is an instrument commonly used to measure resistances, is very satisfactory for detecting insulators having material which is porous or in which there is a conducting path through the faulty part. In localities, however, where the insulators are subjected to long, dry spells, the resistance through the fault may be so high that the faulty member cannot be detected in this way.

Another method which has been used to advantage in many cases is the electrostatic method in which the potential charge across the insulator is indicated by a gap or other means. Any method depending upon the electrostatic distribution of stress may have decided limitations, however, owing to uneven voltage distribution, due to the normal characteristics of the insulator or to the change in voltage distribution due to faulty members in the series or due to variations in electrostatic capacity in different insulators. The megger method or that used to locate faults by the resistance method has important advantages in that each insulator is subjected to the same conditions. Where, however, there is a clean break in an insulator due to cracking in the dielectric or where there is a lack of conducting material across the fault, it may not be possible to locate the fault with the ordinary megger which usually applies 1000 volts to the fault.

Figure 1:
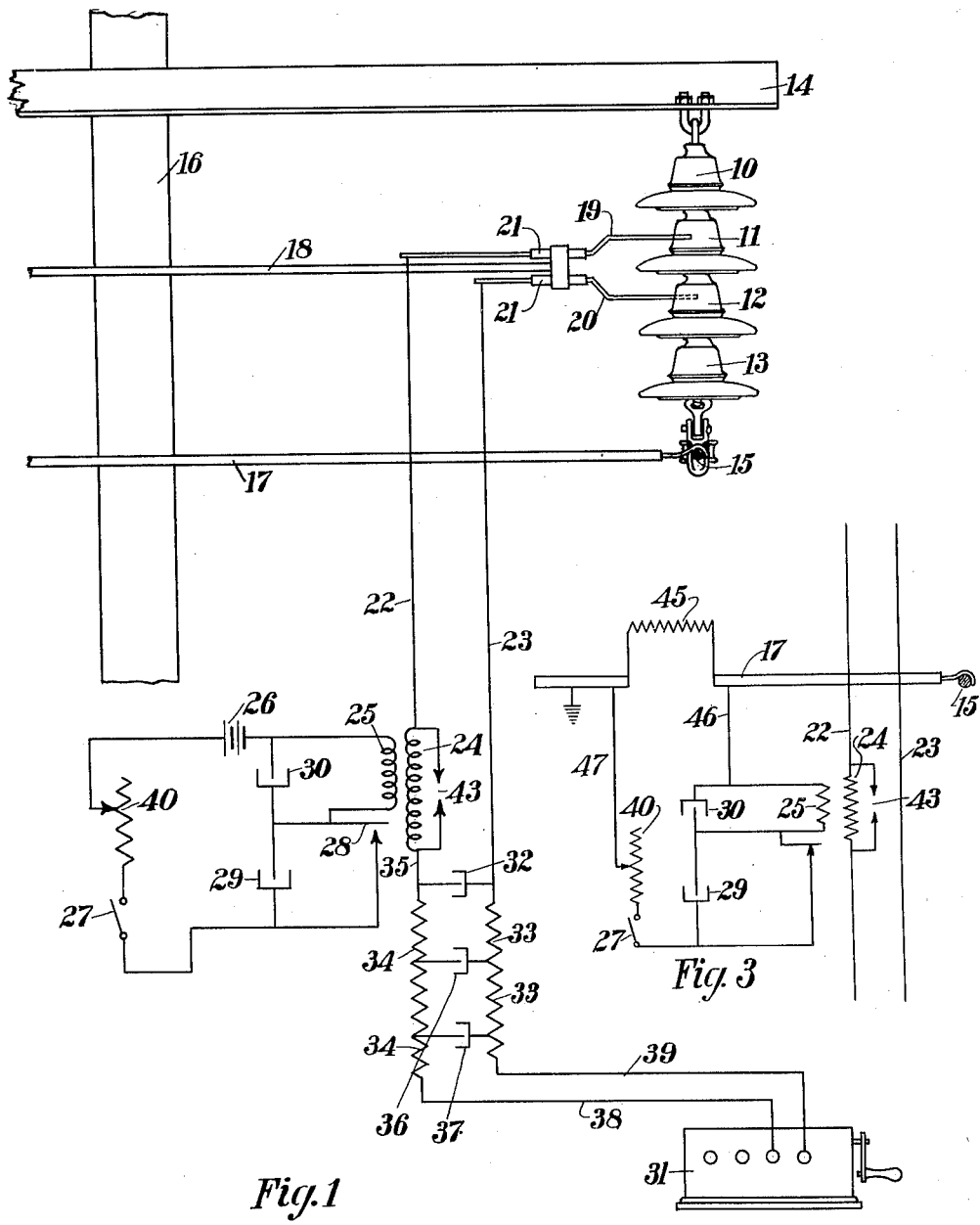
Fig. 1 is a diagrammatic elevation showing one embodiment of the present invention.

In the form of the invention illustrated in Fig. 1, the insulator string composed of members 10, 11, 12 and 13 is suspended from a cross arm 14 and supports a conductor 15. The cross arm 14 extends from from the body of the tower 16. The power conductor 15 is usually grounded during test through a conducting rod 17 in order to avoid placing a high voltage on the test set or endangering the line. A test fork having an insulated handle 18 and prongs 19 and 20 is used to make contact across the two terminals of an insulator unit under test. The prongs or test terminals 19 and 20 are insulated from the handle 18 by insulators 21. Insulated leads 22 and 23 are attached to the contact members 19 and 20. The leads 22 and 23 are usually made of ignition cable which will withstand a considerable voltage. The lead 22 is attached to one terminal of the secondary of an induction coil or transformer which can be used to generate a voltage sufficiently high that any fault occurring between the two electrodes or metal parts attached to the insulating member under test will be arced across or bridged by a discharge. The spark or induction coil of which 24 is the secondary and 25 the primary may be of any suitable design. In general the primary of the coil is energized by means of a battery 26 when the switch 27 is closed. The armature or vibrator 28 makes and breaks contact alternately closing and opening the primary current. This interrupter is operated by a magnetic pull; the sudden breaking of the circuit producing a high voltage in the secondary side as in the ordinary operation of spark coils. While the interruption means may be placed entirely away from the coil, it is usually found preferable to make this a part of the coil assembly itself. The gap 28 on the low side may be prevented from burning by the use of condensers 29 and 30. These condensers may be so adjusted that the oscillations in the secondary winding may be materially increased, thereby tending to increase the discharge through the fault in the dielectric member. This increase in discharge makes detection of the faulty member much easier.

As any instrument which will measure the leakage through a fault necessarily very delicate, owing to the very small current involved, it is necessary to protect these instruments from the oscillation set up by the spark or initial breakdown coil. This is accomplished in the present invention in the following manner:

The leads 22 and 23 must supply a high voltage to the fault. In order to permit the application of the potential generated in the secondary 24 to the fault without forcing the current through the megger or measuring instrument 31, a condenser 32 is placed between the lead 23 and one terminal of the secondary 24. It is seen that when a high potential is produced the circuit is through the leads 22 and 23 and through the condenser 32. This is particularly true where the coil develops a high frequency. In order to protect the measuring instrument 31 from voltage which might breakdown the winding of the indicating parts, resistance or impedances 33 and 34 are used in series with the leads 35 and 23. Since the measuring instrument uses a direct current, the condensers 32, 36 and 37 will have little or no effect upon the operation of the instrument. These condensers, however, will have to have a very high resistance, otherwise they would reduce the sensitiveness of the indicating instrument, showing up as faults.

Where a megger is used, there is a difference in potential between the leads 38 and 39. Owing to the fact that the megger is very sensitive and will indicate a very small current, the protecting resistances 33 and 34 may be very high. The amount of these resistances will depend upon the sensitiveness desired and may usually exceed a hundred megohms and still permit the detection of faulty insulators. These resistances, however, may be readily adjusted to meet conditions.

In operation the high voltage imposed upon the leads 22 and 23 by the secondary 24 causes a flow of current or a discharge through the fault in the insulator 11. The arc produced by the high voltage lowers the resistance so that the difference in potential between the leads 38 and 39 can produce a flow of current. This flow of current may only take place during the discharge of the secondary 24 but in many cases the resistance of the fault is so lowered by the discharge that current will continue to flow through the fault with the relatively low potential developed by the megger 31. The amount of current flowing in the primary of the coil may be adjusted by the resistance 40. The switch 27 is nominally closed only during the period of test, thereby conserving the life or energy of the battery 26. Where the oscillation is not so highly damped, the effect of polarity of the secondary 24 is not so material. If it is found that there is a tendency for a greater discharge in one direction which will interfere with the indication of the megger 31, the battery or secondary may be reversed.

Figure 2:
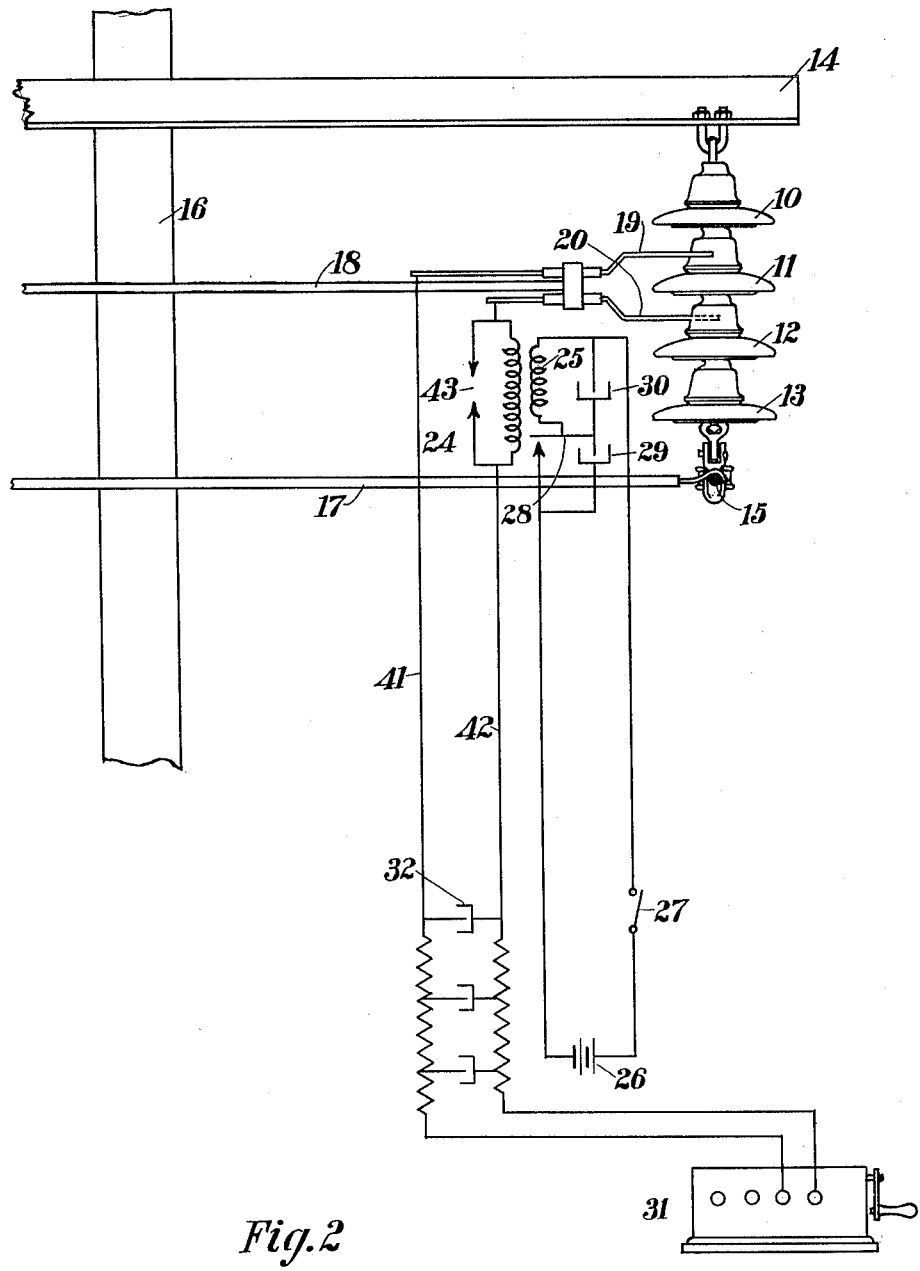
Fig. 2 is a view similar to Fig. 1 showing a slightly different modification.

Owing to the high frequency generally used, there is an appreciable electrostatic absorption due to the capacitance between leads 22 and 23. If this capacitance is too great for the output of the secondary 24, there will not be sufficient voltage to bridge the fault in the dielectric member of the insulator unit 11. In order to reduce this effect the spark coil on transformer may be placed near the test electrodes 19 and 20. This arrangement is shown in Fig. 2. Where the coil is placed near the insulator, it may be much smaller and lighter and incorporated as a part of the testing fork. The capacitance between the leads 41 and 42 is then not material as this capacitance merely helps the condenser 32. With this arrangement the battery or generator 26 supplying current for the primary of the coil may remain on the ground or at any convenient point; the switch 27 being closed as needed. It, of course, is possible to use a common return. This, however, will not affect the operation or scheme and is simply a matter of convenience. The secondary may be provided with a gap 43. This gap may be used to safeguard the secondary or insulation of the leads and can also be used to indicate whether or not the voltage is being generated by the coil.

The invention comprises a high voltage source used for the initial breakdown of the fault, together with a shunt circuit provided with proper impedance and an indicating device which will permit flow of current with the initial breakdown. The shunt and series paths must be such that they will permit the passage of the high voltage current to cause initial breakdown and, at the same time, allow the flow of the measuring or indicating current at a much lower potential without permitting the high voltage initial breakdown potential from damaging the indicating equipment. Where the measuring current flowing from the indicating instrument is uni-directional, it may flow readily through the secondary 24. Where there is sufficient energy available in the secondary, a high shunt resistance may be used across the terminal 24 for the passage of a portion of this current. In general, however, this is not necessary.

Although I have shown an induction coil for providing the initial breakdown high voltage, it will be understood that any other suitable means can be employed for this purpose. In my application Serial Number 479,009 is shown means for diverting energy from the high voltage transmission line which may be employed if desired for supplying the initial breakdown high voltage.

Other means besides the battery 26 may be used to supply energy for the spark coil or transformer winding 25. One method of supplying current to the spark coil is to energize either one or all of the power conductors 15 of a transmission system with a constant potential from a direct current machine or storage battery. Where one conductor is energized and the test is carried out on the conductor which normally carries one of the other phases, the arrangement is the same as that shown in Fig. 1 except that the energy in 26 is replaced by energy taken from the conductor supplied with direct current potential, as shown in Fig. 3. This direct current potential may be between phases or from phase to ground as desired. In some installations, however, it may be desirable to energize all conductors at the same time. In order to obtain energy from the circuit, however, at the tower, the ground lead 17 is broken by the insertion of a resistance 45. Shunt leads running from this resistance will replace the battery 26 shown in Fig. 1. If desired, the resistance may be omitted, electrical connection being made from the conductor 15 to the circuit through the lead 46, and to the ground on the other side by the conductor 47; the battery being then omitted. This arrangement makes it unnecessary to transport a battery. If desired, a direct current may be made to pass through a motor generator set which will energize the coil or transformer producing the high voltage. Where a low voltage direct current is used, the resistance path between conductor 15 and ground will tend to prevent any excessive or dangerous voltage, particularly where a very small limiting gap is placed across the resistance in ground lead 17.

I claim:

1. Testing apparatus comprising a high voltage source for causing initial breakdown across the fault of a test piece, means other than said source for causing a flow of detection current to follow the breakdown across said fault, an instrument for indicating flow of said detection current across said fault, and means for protecting said instrument from the high voltage of said source.

2. Testing apparatus for detecting an insulator fault comprising means for applying a high voltage to the test piece to reduce the resistance of the fault by producing a discharge across the fault, a source of detection current in circuit with said fault, and an instrument for indicating current from said source across the fault when the resistance thereof has been reduced.

3. Testing apparatus for detecting faulty insulators comprising a source of high voltage for producing an initial breakdown across a fault in the test piece, a source of direct current for causing the flow of current across the fault when it has been broken down, and means for indicating the flow of such direct current.

4. Testing apparatus comprising a source of high voltage for causing initial breakdown across a fault in a test piece to reduce the resistance of the fault, a source of detection current to be applied to said fault, an instrument in circuit with said fault and source of detection current for indicating the flow of detection current across said fault, and means for protecting said instrument from the high voltage source.

5. Testing apparatus comprising terminals for applying test voltage to a test piece, a source of high voltage connected with said terminals to produce initial breakdown of a fault in said test piece for reducing the resistance of said fault, a source of detection current connected with said terminals, and an indicating instrument in circuit with said terminals and said source of detection current, and impedance interposed between said high voltage source and said instrument.

6. Insulator testing apparatus comprising a pair of terminals for connection with a test piece, an induction coil having its high voltage winding connected with said terminals, means for energizing said induction coil, a megger connected with said terminals for detecting flow of current through said test piece after initial breakdown thereof produced by said induction coil, and impedance in the circuit of said megger to protect said megger from the high voltage of said induction coil.

7. Testing apparatus comprising terminal members for connection with an insulator to be tested, a source of high voltage connected with said terminals to apply initial breakdown voltage to the test piece, a megger connected with said terminals for detecting the flow of current through said test piece upon application of the breakdown voltage thereto, and impedance in the circuit of said megger for protecting the megger against the high voltage source.

8. Testing apparatus for detecting faulty insulators comprising a pair of terminals for connection with an insulator to be tested, conductors connected with said terminals, a source of high voltage and an indicating instrument connected in series with each other by said conductors, and a condenser in shunt with said indicating instrument to provide a shunt return for the high voltage current from said high voltage source to protect the indicating instrument from said high voltage source.

9. Testing apparatus for detecting faulty insulators comprising terminals for connection with test pieces, a source of high voltage for producing initial breakdown across the fault in a test piece, an indicating instrument and source of lower voltage connected in circuit with said high voltage source and terminals, impedance interposed between said indicating instrument and high voltage source to protect said indicating instrument, and a condenser in shunt with said indicating instrument to provide a shunt return for said high voltage source.

10. Testing apparatus for detecting faulty insulators comprising terminals for engaging a test piece, an induction coil having its high voltage winding connected with said terminals to apply initial breakdown voltage to a test piece, a megger in circuit with said induction coil and terminals for supplying a lower voltage current and for indicating the flow of said lower voltage current across a fault in said test piece after initial breakdown of the fault by the voltage of said induction coil, impedance in circuit with said megger to protect said megger from the voltage in said induction coil, and a condenser forming a return circuit for the high voltage current from said induction coil in shunt with said megger.

11. The method of detecting faulty insulators comprising the steps of first applying high voltage to a test piece to produce initial breakdown of the fault in said piece and thereupon causing the flow of an indicating current across said fault from a source other than the source of said high voltage.

12. The method of detecting faulty insulators comprising the steps of applying an initial high voltage alternating current to a test piece to produce a breakdown across a fault in said piece, and thereupon applying direct current to said test piece and detecting the flow of said direct current across the fault in said test piece.

13. The method of testing insulators comprising the steps of applying initial high voltage to a test piece to cause a breakdown of a fault in said piece and thereupon applying a source of indicating current to said test piece and protecting said source of indicating current from the initial breakdown high voltage.

14. The method of testing insulators comprising the steps of applying an alternating high voltage to a test piece to produce initial breakdown across a fault in said piece, and thereupon applying a source of detection current to said piece having an indicator in circuit therewith, and protecting said indicator and source of detection current from the initial breakdown high voltage.

15. Apparatus for testing insulators supporting a line of a transmission system comprising a step-up transformer, means for supplying current to the primary of said transformer from a line of said system, means for applying the voltage induced in the secondary of said transformer to an insulator of said system to produce an initial breakdown of a defect in said insulator, and means for supplying indicating current to the insulator being tested when a defect therein has been broken down by said high potential.

16. The method of testing an insulator supporting a line of a transmission system comprising the steps of supplying direct current to a line of said system, energizing test apparatus at a point along said system by the current from said line and applying test voltage from said test set to an insulator supporting the line of said system.

17. The method of testing insulators supporting a line of transmission system comprising the steps of supplying the line of said system with direct current, energizing a high potential alternating current device by current from said line at a point along said line and applying the high potential from said device to an insulator of said system.

ARTHUR O. AUSTIN.